US010451177B2

(12) United States Patent
Hélot et al.

(10) Patent No.: US 10,451,177 B2
(45) Date of Patent: Oct. 22, 2019

(54) SHIFT-BY-WIRE SHIFT ELEMENT INTEGRATED INTO A MOTOR VEHICLE HAND REST

(71) Applicant: AUDI AG, Ingolstadt (DE)

(72) Inventors: Jacques Hélot, Ingolstadt (DE); Edwin Ollefers, Ingolstadt (DE); Vladimir Macoun, Ingolstadt (DE); Ulrich Beierlein, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 205 days.

(21) Appl. No.: 15/574,070

(22) PCT Filed: Jun. 29, 2016

(86) PCT No.: PCT/EP2016/001104
§ 371 (c)(1),
(2) Date: Nov. 14, 2017

(87) PCT Pub. No.: WO2017/020979
PCT Pub. Date: Feb. 9, 2017

(65) Prior Publication Data

US 2018/0292002 A1 Oct. 11, 2018

(30) Foreign Application Priority Data

Aug. 6, 2015 (DE) ........................ 10 2015 010 026

(51) Int. Cl.
*B60K 17/04* (2006.01)
*B60K 17/12* (2006.01)
(Continued)

(52) U.S. Cl.
CPC ............. *F16H 59/12* (2013.01); *B60K 20/02* (2013.01); *F16H 59/0217* (2013.01);
(Continued)

(58) Field of Classification Search
CPC combination set(s) only.
See application file for complete search history.

(56) References Cited

U.S. PATENT DOCUMENTS 5,161,422 A * 11/1992 Suman ................... B60K 20/04
74/335
9,435,425 B2 * 9/2016 Heo ...................... F16H 59/044
(Continued)

FOREIGN PATENT DOCUMENTS

CN 102822570 A 12/2012
DE 197 46 438 A1 4/1999
(Continued)

OTHER PUBLICATIONS

Chinese Office Action dated Apr. 18, 2018, in corresponding Chinese Patent Application No. 201680017123.3, 5 pgs.
(Continued)

*Primary Examiner* — Jake Cook
(74) *Attorney, Agent, or Firm* — Staas & Halsey LLP

(57) ABSTRACT

A rest element extends along a transverse direction from a passenger side to an opposite driver side and has a rest surface, which faces in a vertical direction, for a user's hand. A shift element is arranged at a driver-side end of the rest element and between the rest surface and an opposite lower side of the rest element, for operating a shift-by-wire gear selection controller. The shift element is configured to be movable along the transverse direction between a stowage position and a shift position. The shift element is arranged immovably with respect to a longitudinal direction in the stowage position and is mounted movably unidirectionally or bidirectionally in the shift position.

20 Claims, 8 Drawing Sheets

1
2
T
9
7
5
3
16
15
SHIFT
GEAR SELEC-TION
SCREEN
17
18
S1
14
11
P
6
8
10
12
13
Z
Y
X
4

(51) Int. Cl.

| | |
|---|---|
| ***F16H 59/12*** | (2006.01) |
| ***B60K 20/02*** | (2006.01) |
| ***F16H 59/02*** | (2006.01) |
| ***G05G 1/02*** | (2006.01) |

(52) U.S. Cl.
CPC ........ *G05G 1/025* (2013.01); *B60Y 2400/402* (2013.01); *F16H 2708/22* (2013.01)

(56) References Cited

U.S. PATENT DOCUMENTS

| | | | | |
|---|---|---|---|---|
| 2013/0091971 A1* | 4/2013 | Helot | B60K 20/02 74/473.3 |
| 2016/0167719 A1* | 6/2016 | Higashiguchi | A01B 63/10 180/336 |

FOREIGN PATENT DOCUMENTS

| | | |
|---|---|---|
| DE | 20 2005 020 727 U1 | 8/2006 |
| DE | 10 2006 007 008 A1 | 8/2007 |
| DE | 10 2009 008 731 A1 | 10/2009 |
| DE | 10 2010 013 169 B4 | 6/2013 |
| DE | 102015010026.2 | 8/2015 |
| EP | 2 687 760 A2 | 1/2014 |
| EP | PCT/EP2016/001104 | 6/2016 |
| JP | 6-286491 | 10/1994 |
| WO | 2011/137267 A1 | 11/2011 |

OTHER PUBLICATIONS

International Search Report for PCT/EP2016/001104 dated Sep. 16, 2016, 10 pp.

German Office Action for German Application No. 10 2015 010 026.2 dated Mar. 15, 2016, 5 pp.

German Search Report for German Application No. 10 2015 010 026.2 dated Jan. 9, 2017, 10 pp.

Translation of International Preliminary Report on Patentability dated Feb. 15, 2018.

* cited by examiner

GEAR SELEC- TION
SHIFT
SCREEN
START STOP 7
20
13
6
9
10
21
19
14

7
9
6
13
10
23
L2
S1
S2
L1
R
N
D
19
22
14

7
9
6
13
10
26
19
24
25
S2
R
N
D 7
9
6
13
27
2x
28
10
S2
19
R
N
D 6
22
10
S2
start
stop
13
PRND
RECUP

SHIFT-BY-WIRE SHIFT ELEMENT INTEGRATED INTO A MOTOR VEHICLE HAND REST

CROSS REFERENCE TO RELATED APPLICATIONS

This application is the U.S. national stage of International Application No. PCT/EP2016/001104, filed Jun. 29, 2016 and claims the benefit thereof. The International Application claims the benefits of German Application No. 10 2015 010 026.2 filed on Aug. 6, 2015, both applications are incorporated by reference herein in their entirety.

BACKGROUND

Described below is a hand rest device for a motor vehicle that, in addition to a rest surface for a user's hand, has a shift element, by which a shift-by-wire gear selection controller can be operated. Also described is a motor vehicle with the hand rest device.

A hand rest device of the described type is known, for example, from DE 10 2010 013 169 B4. According thereto, the rest element together with the support surface for the user's hand at the same time forms a drive stage selector element by the entire rest element being displaceable in the longitudinal direction in the motor vehicle. In order to couple the displacement movement to the actual shift-by-wire gear selection controller, a shift element is integrated in a base of the rest element that has to be pressed in order to activate or deactivate the functioning of the drive stage selector element.

It is disadvantageous in the case of the drive stage selector element from the related art that the rest element cannot be used by the passenger, but rather always has to be kept free for the driver so that the latter can displace the entire rest element if the need arises. A further problem is that, while the rest element is being used as a support, a change of the drive stage can be inadvertently triggered if the driver, while using the rest element as a support, also exerts a force on the rest surface in the longitudinal direction.

SUMMARY

By providing a universally usable rest surface for a user's hand for operating, for example, a touch display in a motor vehicle, it is possible to avoid inadvertent and/or unintended operating procedures caused at the shift-by-wire gear selection controller.

In the description below of the hand rest device, three directions are indicated for better orientation, namely a longitudinal direction, a transverse direction and a vertical direction. These directions correspond to the directions of the same name in the motor vehicle if the hand rest device is installed in an installation position as intended in the motor vehicle. The three directions mentioned are perpendicular to one another and form a system of coordinates, wherein the longitudinal direction points from the vehicle rear to the vehicle front, the transverse direction, for example, from the left vehicle side to the right vehicle side, and the vertical direction from the vehicle floor to the vehicle roof.

The hand rest device has a rest element which extends along the transverse direction from a passenger side of the hand rest device to an opposite driver side of the hand rest device. The passenger side here is in particular that side of the hand rest device which faces the passenger seat in the abovementioned installed position as intended. Accordingly, the driver side is the side facing the driver seat. The rest element has a rest surface, which faces in the vertical direction, for a user's hand. In other words, a normal vector of the rest surface is oriented in such a manner that it points completely in the vertical direction, or at least the vertical direction forms the greatest vector component in the described system of the coordinates.

A shift element for operating a shift-by-wire gear selection controller is integrated in the rest element. The shift element is arranged at a driver-side end of the rest element and between the rest surface and an opposite lower side of the rest element. Herein, a shift-by-wire gear selection controller should be understood as meaning in particular an electromechanical shift controller for an automatic transmission, wherein gear selection modes of the automatic transmission (in particular P—parking, N—neutral, R—reverse gear, D—forward automatic gear selection/drive, S—sport, Recup—recuperation) are set by a corresponding electric or digital shift signal. To make a selection from the gear selection modes, the shift element described is provided.

The shift element is configured to be movable along the transverse direction of the hand rest device, between a stowage position, in which the shift element is mostly or entirely recessed in the rest element, and a shift position, in which the shift element projects further out of the rest element than in the stowage position. In the stowage position, the shift element is arranged immovably or fixedly with respect to the longitudinal direction. By contrast, in the shift position, the shift element is mounted movably unidirectionally or bidirectionally with respect to the longitudinal direction. If, in other words, the shift element is mostly or entirely recessed in the rest element in the stowage position, and also cannot move along the longitudinal direction. If, by contrast, the shift element projects further out of the rest element in the shift position than in the stowage position, the shift element can also move along the longitudinal direction.

The hand rest device described herein affords the advantage that a user can use the rest surface with his hand without there being a risk, with the hand on the rest surface, of also shifting the shift-by-wire gear selection controller. In other words, no impairment of the use of the hand rest is caused by providing the shift element in the hand rest device. Also described below are optional developments, by which additional advantages arise.

In order to shift or to move the shift element between the stowage position and the shift position, a development makes provision for the shift element to have a push-push lock. Such a push-push lock is also called a ball point pen lock. It is designed in order, when the shift element is pressed into the rest element, to release the rest element out of the stowage position into the shift position and, after the shift element is pressed once again into the rest element, to hold the shift element in the stowage position again. This gives rise to the advantage that the shift element, even in the stowage position, in which the shift element is difficult to grasp because it is recessed in the rest element, can nevertheless easily be brought into the shift position. As an alternative to a push-push lock, it is also possible, for example, to provide a motor, by which the shift element is changed between the stowage position and the shift position depending on a change signal.

A development takes into consideration the fact that the handling of the shift element turns out to be simpler for a user if the latter can grasp the shift element. For this purpose, it is provided that the shift element has a finger rest region which, at least in the shift position, projects out of the rest element in the longitudinal direction. The user can therefore grasp the driver-side ends of the rest element and, for example, can place the index finger, middle finger and ring finger onto the finger rest region. The user uses the thumb to additionally grasp that part of the shift element which projects out in the transverse direction. The shift element is therefore then located between the thumb, on the one hand, and the remaining fingers of the user, on the other hand. The finger rest element projects out in the longitudinal direction, in particular toward a front side of the hand rest device, i.e. toward the vehicle front, when the hand rest device is installed as intended in the motor vehicle.

A development takes into consideration the fact that, irrespective of the set gear selection mode of the shift-by-wire gear selection controller, the shift element should always have the same position so that the shift element remains blindly operable for the user. For this purpose, it is provided that, in the shift position, the shift element is mounted monostably with respect to the longitudinal direction. In other words, in the shift position, the shift element always has the same inoperative position when it is not operated, i.e. is not touched by the user.

According to a development, the hand rest device also has the electronics necessary for activating the shift-by-wire gear selection controller. For this purpose, the shift-by-wire gear selection controller is designed in order, with the shift element in the shift position, upon deflection of the shift element along the longitudinal direction, i.e., for example, forward, to generate an R shift signal for setting a reverse gear and, upon opposite deflection of the shift element along the longitudinal direction, i.e., for example, rearward, to generate a D shift signal for setting a forward automatic gear selection (gear selection mode D). The deflection here can include a multiple repetition of a deflection movement. When the shift element is brought from the stowage position into the shift position, in particular first of all the generation of an N shift signal is provided which sets a neutral mode or neutral gear or idling. Starting from this setting, the R shift signal can then be generated by the described actuation. If deflection then takes place in the opposite direction, then first of all the N shift signal can again be generated. Upon deflection once again in the same direction, i.e. in an opposite direction to the direction for the R shift signal, the D shift signal can then be generated. It can also be provided that, by deflection once again in the same direction, recuperation stages are set, by which a braking torque of an electric generator is predetermined, with which the generator brakes a rolling movement of the motor vehicle, for example when driving down a slope or downhill. Alternatively, upon deflection once again (in the gear selection mode D), an S shift signal can be generated for a gear selection mode S (sport). The shift-by-wire gear selection controller can be, for example, a microcontroller or microprocessor.

According to a development, the driver-side end of the rest element is arranged freely in the air. In other words, the driver-side end of the rest element is held only by the rest element itself. There is therefore only a single fastening of the rest element at the opposite, passenger-side end, via which fastening the rest element is held in the hand rest device. Thus, the driver-side end of the rest element may be configured to be graspable by the user, in particular by the driver. This has the advantage that the user can better grasp the shift element. A further advantage is that the driver can look under the rest element because his view is not blocked by a driver-side holder for the rest element. A screen or a display can therefore be arranged in an advantageous manner under the shift element.

A development provides a screen with which different information can be displayed flexibly and/or variably, wherein the currently engaged gear selection mode of the shift-by-wire gear selection controller can also be displayed if the need arises. For this purpose, it is provided that the rest element extends over a bottom region which faces the lower side of the rest element. The rest element can therefore be configured, for example, as a bow or bar or prop and can be arranged at a distance of greater than 0 above the bottom region. The screen which has a display area for displaying pixel-based display graphics is provided in the bottom region. The screen can be, for example, a TFT screen (TFT—thin film transistor), or an LCD screen (LCD—liquid crystal display), or an OLED screen (OLED—organic light emitting diode). Pixel-based display graphics mean the depiction, which is known from the related art, of graphical content in the manner of pixels, the depiction being able to be set or changed by predefining digital image data. An advantage of this embodiment is that pixel-based display graphics via which information can be displayed to the driver can be depicted in the driver's view below the rest element. The screen may be a touchscreen with which the user can use his hand to operate the motor vehicle from the rest element via the touchscreen. It can even be provided here that a distance of the touchscreen from the rest element is smaller than 15 centimeters, and therefore the user can allow the hand or the wrist to rest on the rest surface and can nevertheless touch the touchscreen with his fingers. The size of the rest surface along the transverse direction may be at least 80 percent, in particular at least 90 percent, of the size of the display area along the direction. As a result, the user can still allow his hand to rest on the depositing surface even when carrying out operations on edge regions of the display area.

A development provides the described displaying of the gear selection mode on the screen. For this purpose, the screen is designed to produce a shift display on the display area of a gear selection mode (for example "P", "N", "D", "R", "S") set at the shift-by-wire gear selection controller. This affords the advantage that the user, on looking at the shift element, sees the currently set gear selection mode on the display area below the shift element. For this purpose, the control of the display can be realized, for example, using a microcontroller or a microprocessor.

A motor vehicle may include a shift-by-wire gear selection controller, such as known in the related art. As an operating interface, an embodiment of the hand rest device described herein may be provided, wherein the hand rest device can be arranged in a central console between a driver seat and a passenger seat. This affords the advantage that the depositing surface as a hand rest is reachable both by the driver and by the passenger, i.e. on both sides, for operation of a touchscreen and there is nevertheless no risk here that the driver will be obstructed in shifting or operating the shift-by-wire gear selection controller.

The hand rest element may be arranged immovably with respect to the central console. As a result, its position in the motor vehicle is independent of the gear selection mode set.

According to a development, it is provided that in the shift position, the shift element is only released for the movement along the longitudinal direction after or during actuation of an additional mechanical button or an operating panel of a touch-sensitive surface. As a result, an inadvertent triggering of a change of the gear selection mode is prevented. The touch-sensitive surface can be provided by a touchscreen or touchpad (touch-sensitive sensor panel). The possible directions of movement can be indicated by symbols, in particular illuminated symbols. For this purpose, illuminating device(s) can be integrated in the shift element.

According to a development, it is provided that a start-stop function for starting and stopping an engine of the motor vehicle is integrated in the shift element by the hand rest device being designed to keep the engine in a switched-off state in the stowage position of the shift element and to operate the engine in the shift position of the shift element. An additional start-stop shift element, for example the start-stop button customary in the related art, is then unnecessary.

The motor vehicle may be a car, in particular a passenger car.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
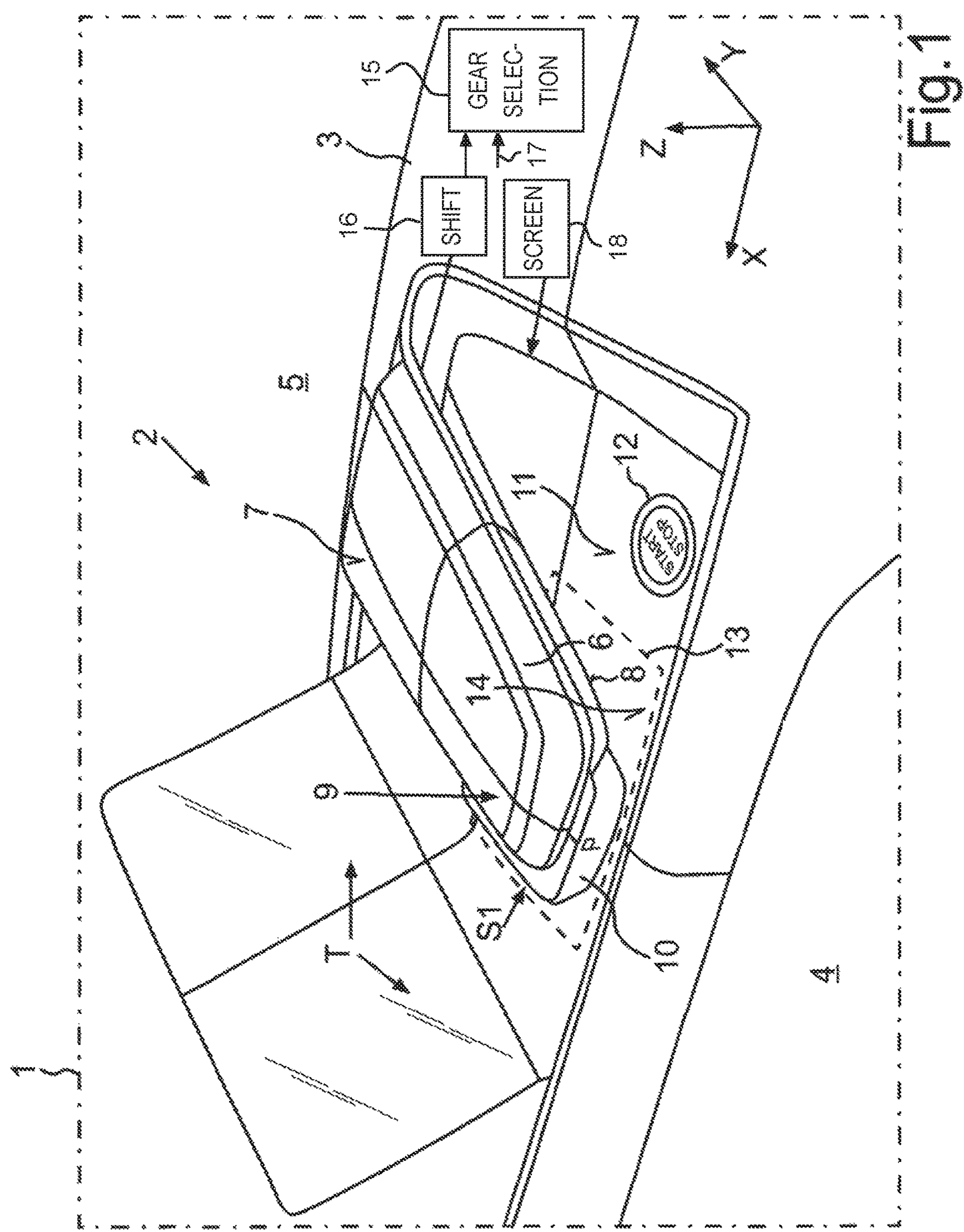
FIG. 1 is a schematic perspective view of an embodiment of the motor vehicle with a hand rest device.

Reference will now be made in detail to the preferred embodiments, examples of which are illustrated in the accompanying drawings, wherein like reference numerals refer to like elements throughout.

An exemplary embodiment is explained below. In the exemplary embodiment, the described components of the embodiment each represent individual features which are to be considered independently of one another and which in each case also independently of one another develop the invention and should therefore also be regarded as part of the invention individually or in a different combination than the combination shown. Furthermore, the described embodiment can also be supplemented by further of the already described features of the invention.

In the drawings, functionally identical elements are in each case provided with the same reference signs.

FIG. 1 shows a motor vehicle 1, in which it can be, for example, a car, in particular a passenger car. The motor vehicle 1 has a hand rest device 2 which can be arranged, for example, in a central console 3. For better orientation, a system of coordinates of the motor vehicle 1 with an X axis oriented along a longitudinal direction of the motor vehicle 1, a Y axis oriented along a transverse direction of the motor vehicle 1, and a Z axis oriented along a vertical axis of the motor vehicle 1. The central console 3 can be located between a driver seat 4 and a passenger seat 5, which are represented in FIG. 1 only by their reference signs. The driver seat 4 represents a driver side of the rest device 2, the passenger seat 5 represents a passenger side of the rest device 2.

The hand rest device 2 has a rest element 6 which can be configured, for example, as a prop or bar or bow. The rest element 6 is oriented in its longitudinal extent along the Y direction. The rest element 6 can be formed, for example, on the basis of a body made of plastic or metal. In addition, the body can be covered with leather and/or foam, which increases the comfort and/or the brittleness. The rest element 6 provides a rest surface 7 for a hand and/or a wrist of a driver and/or passenger. The rest surface 7 faces upward in the Z direction. Opposite the rest surface 7, the rest element 6 has a lower side 8. At a driver-side end 9 of the rest element 6, a shift element 10 is arranged in the rest element 6 between the rest surface 7 and the lower side 8. FIG. 1 illustrates the shift element 10 in a stowage position S1, in which it is mainly arranged or recessed in the rest element 6. The shift element 10 can include, for example, an injection molded part as handle or operating part.

The rest element 6 can be arranged above a bottom region 11 which can be configured, for example, as a depression or hollow or compartment or display (screen) in the central console 3. For example, a start-stop shift element 12 for starting and stopping an internal combustion engine or electric motor of the motor vehicle 1 can be provided in the bottom region 11. The display or the screen 13 can be arranged in the bottom region 11. Graphical elements or pixel-based display graphics can be displayed by a display area 14 of the screen 13.

A shift-by-wire system or a shift-by-wire gear selection controller 15 can be operated by the shift element 10. For this purpose, the hand rest device 2 can have a shift control 16 for the shift-by-wire gear selection controller 15, by which shift signals 17 for the gear selection controller 15 can be generated depending on an actuation of the shift element 10. The shift signals 17 can include, for example, a P shift signal, an R shift signal, a D shift signal, an N shift signal, an S signal and/or a selection signal for a recuperation stage (Recup), wherein the shift signals 17 can select the respective gear selection mode P, R, D, N or S of the same name. For example, a shift sequence R-N-D-S-Recup 1 to 4 can be provided.

To control the screen 13, i.e. to set its display contents, the hand rest device 2 can have a screen control 18 for the screen 13. The gear and screen controls 16, 18 can be realized, for example, by a microcontroller or microprocessor.

An operating procedure of the gear selection device 15 by the shift element 10 is illustrated below with reference to FIG. 2 to FIG. 6.

Figure 2:
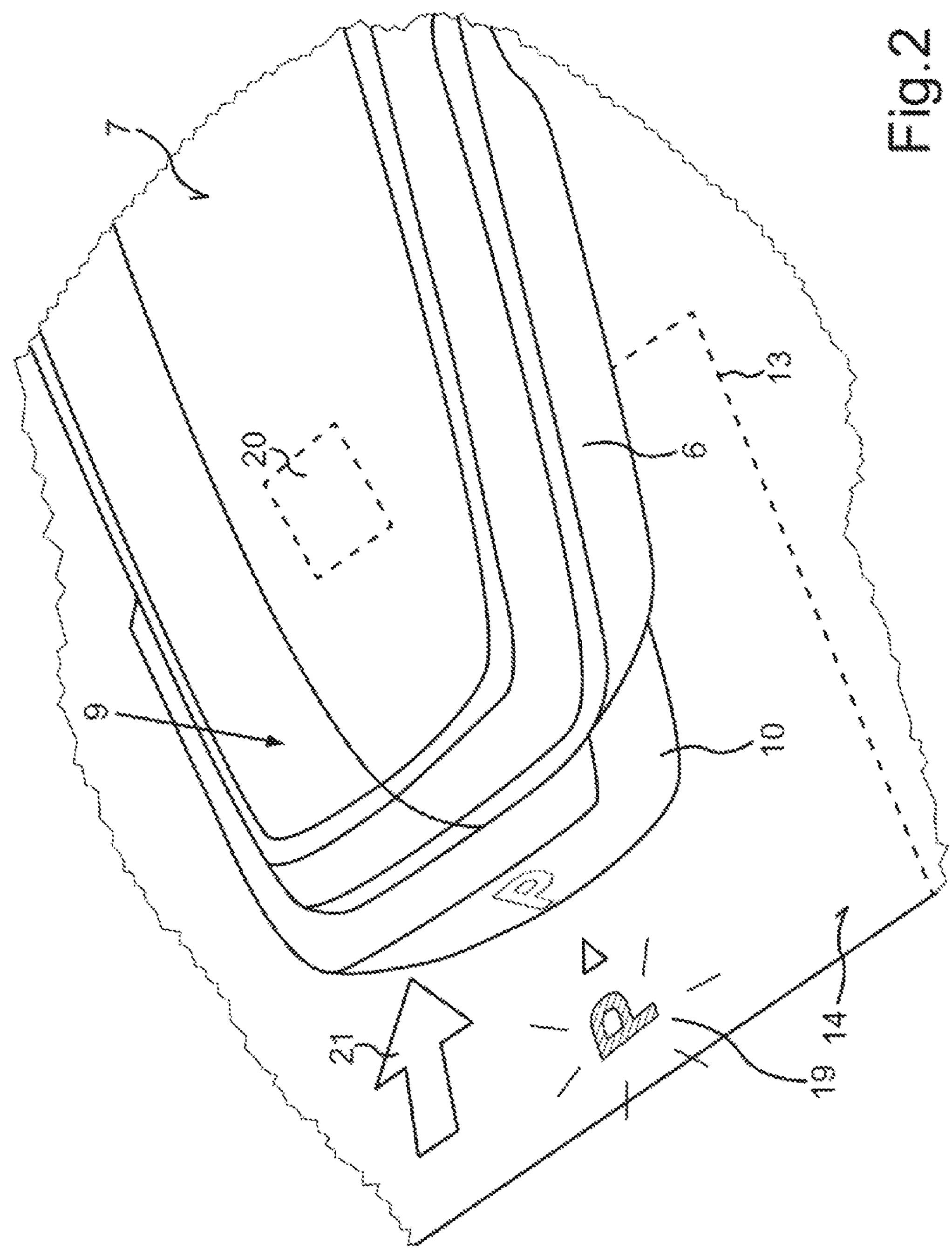
FIG. 2 is a schematic perspective view of the hand rest device while a shift element is in a stowage position.

FIG. 2 shows how the stowage position S1 can be visualized by or displayed to the driver by display graphics 19 on the display area 14. FIG. 2 furthermore shows how the shift element 10 can be moved out of the stowage position S1 illustrated in FIG. 1. The shift element 10 can have, for example, a push-push lock 20. By pushing 21 the shift element 10 into the rest element 6 along the Y direction, the shift element can be, for example, unlocked. In other words, the shift element 10 is accommodated on the driver side of the rest element 6 in such a manner that the shift element 10 is pushed virtually completely under the rest surface 7 in the stowage position S1. The shift element 10 cannot be moved in this case along the X direction. It is an advantage that it is visible whether the motor vehicle has or has not been shifted into the gear selection mode "P".

Figure 3:
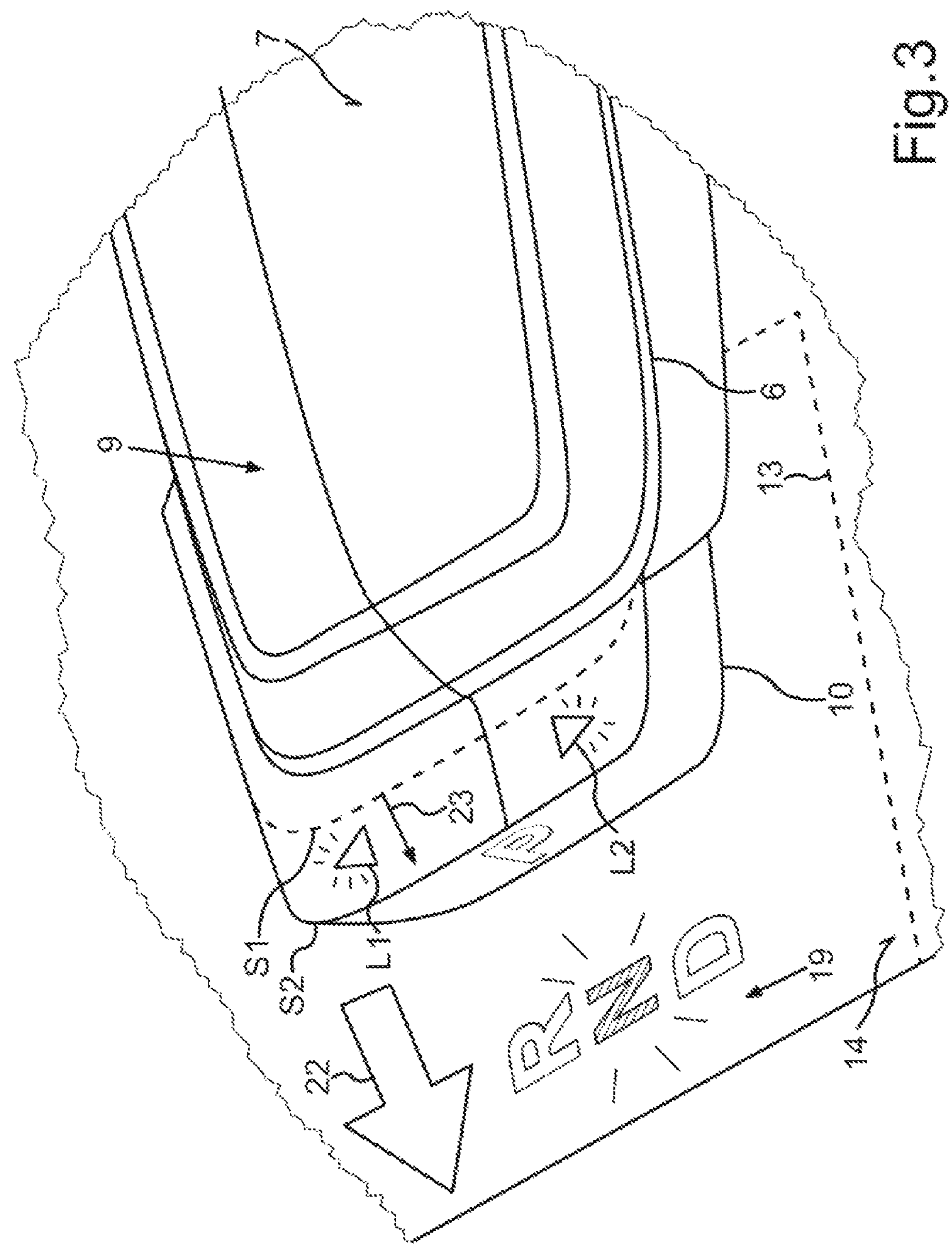
FIG. 3 is a schematic perspective view of the hand rest device during a change of the shift element from the stowage position into a shift position.

FIG. 3 shows how, after release of the shift element 10, the latter carries out a disengaging movement or deployment movement 22 from the stowage position S1 along the Y axis into a shift position S2. This results in a displacement 23 of the shift element 10 out of the rest element 6 along the Y direction. During the change from the stowage position S1 into the shift position S2, the shift control 16 generates an N signal, by which the gear selection controller 15 is shifted into the neutral gear or idling. The screen control 18 for the screen 13 correspondingly displays the set idling ("N") to the driver on the display area 14 via the display graphics 19.

If the shift element 10 is in the shift position S2, the shift element 10 can also be moved along the X direction. The shift element is mounted monostably here. The movement in the X direction is bidirectional, i.e. is possible both toward the vehicle front and toward the vehicle rear. The possible directions of movement can be displayed by symbols, in particular illuminated symbols L1, L2. For this purpose, illuminating device(s) (not illustrated) can be integrated in the shift element 10. The illuminating device(s) can be deactivated in the stowage position S1 and activated in the shift position S2.

In order to come out of the stowage position S1, pressure is exerted laterally on the shift element 10 in the described manner. In the resulting shift position S2, the shift element 10 can be comfortably moved by the thumb forward toward the vehicle front along the X direction and by the index finger rearward toward the vehicle rear counter to the X direction.

Figure 4:
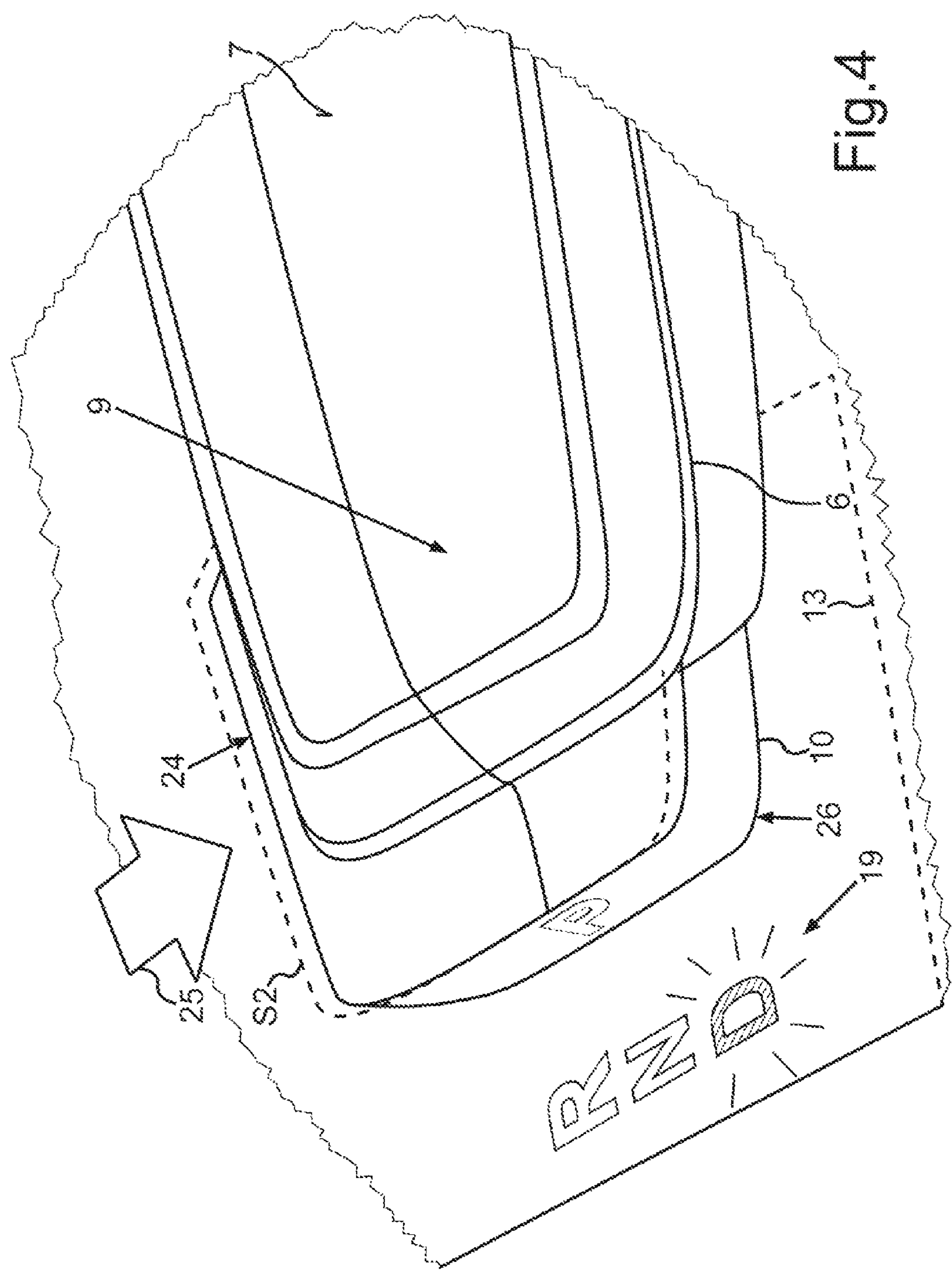
FIG. 4 is a schematic perspective view of the hand rest device during a shift operation to produce a D shift signal.

FIG. 4 shows how, in the shift position S2 after the deployment movement 22 from the stowage position S1, the shift element 10 can be used in order to shift a D shift signal for shifting into the forward gear selection mode (D—Drive) of the gear selection controller. For placing, for example, the index finger onto the shift element 10, the latter has an additional finger rest region 24 which projects out of the rest element in the X direction.

The deflection movement 25, which is brought about by the user by pressing the finger rest region 24, deflects the shift element 10 counter to the X direction toward the vehicle rear, as a result of which the shift control 16 generates a D shift signal for the gear selection controller 15. On account of the monostable mounting, the shift element 10 automatically changes back out of the resulting deflection position 26 into the shift position S2 after the user has released the fingers again from the finger rest region 24 or has appropriately reduced the finger force. The display graphics 19 are correspondingly set by the screen control 18 for the screen 13.

Figure 5:
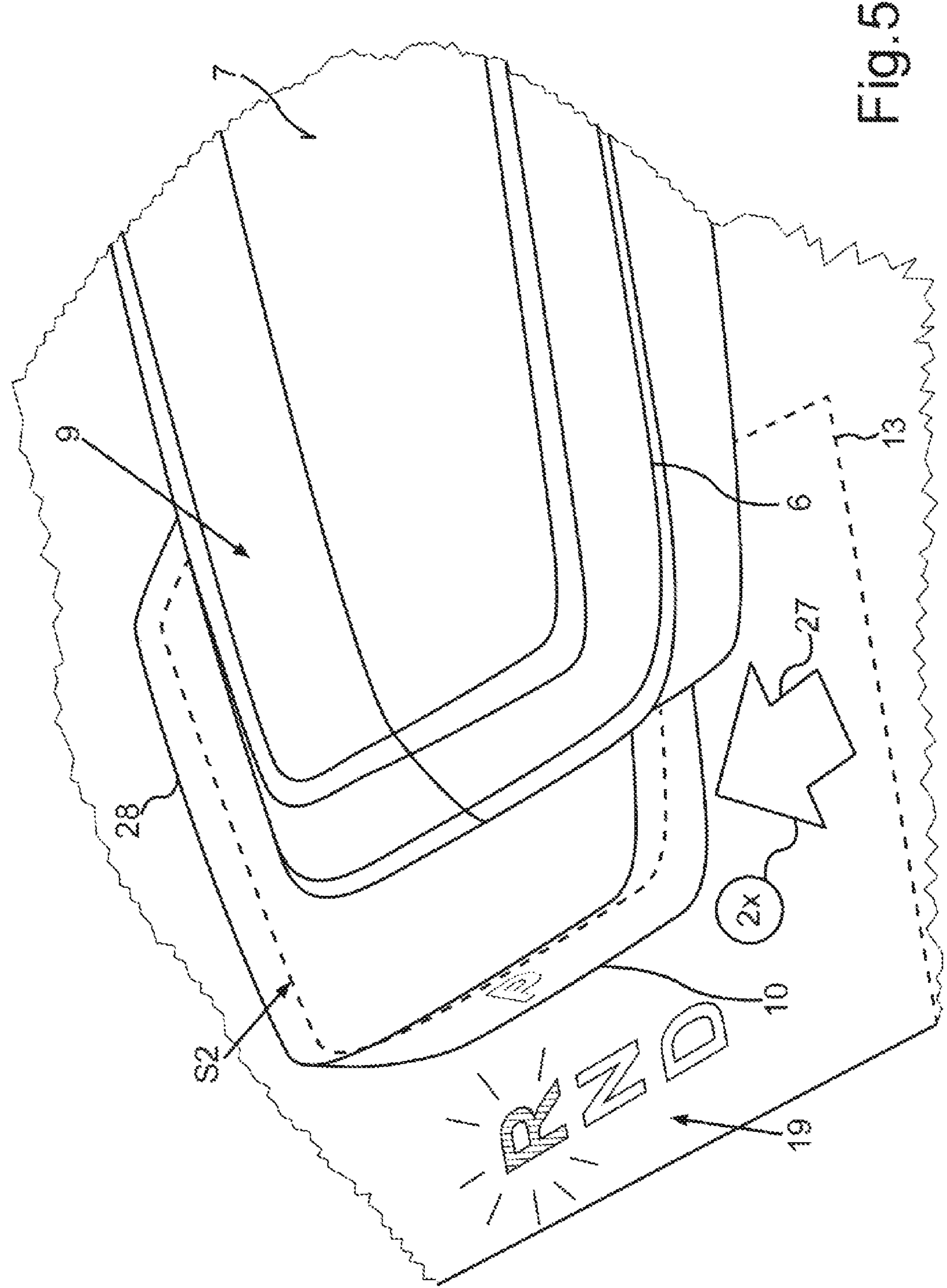
FIG. 5 is a schematic perspective view of the hand rest device during a shift operation to produce an R shift signal.

FIG. 5 illustrates how, starting from the gear selection mode D set, the user by twice forward pressing 27 of the shift element 10 into a deflection position 28, operates the shift control 16 to the effect that the latter first of all transmits to the gear selection controller 15 an N shift signal for a gear selection mode N and then an R shift signal for a gear selection mode R. The motor vehicle 1 is then in the reverse gear.

Figure 6:
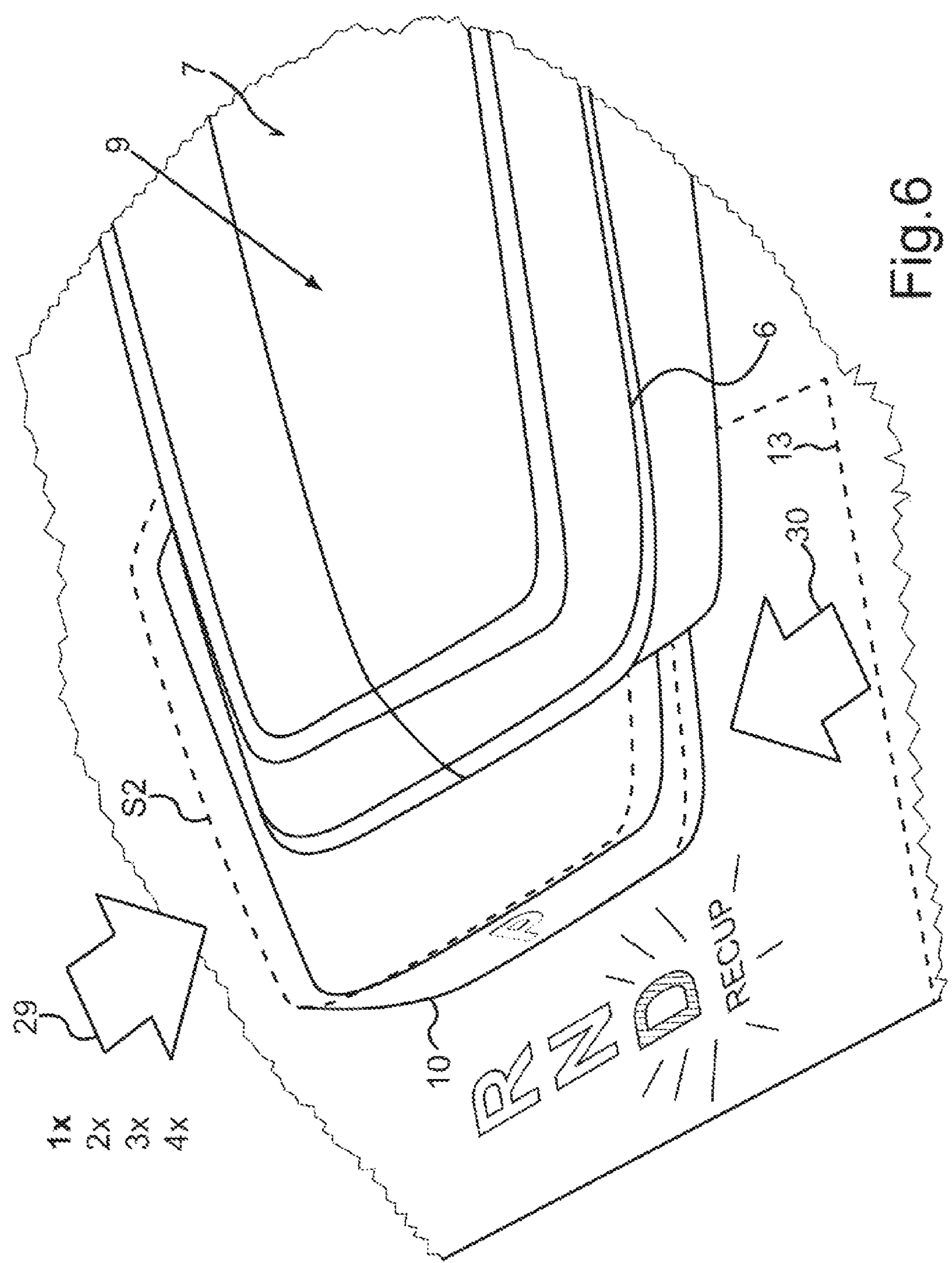
FIG. 6 is a schematic perspective view of the hand rest device during a shift operation to set a recuperation stage.

FIG. 6 illustrates how, alternatively, starting from the gear selection mode D illustrated in FIG. 4, by successive rearward shifting 29 of the shift element 10, the driver can set different recuperation stages. A single pushing back 30 of the shift element 10 into the deflection position 28 sets the recuperation stage 0, which corresponds to the gear selection mode D.

The rest element 6 is arranged statically in the motor vehicle 1, i.e. fixedly, for example, on the central console 3. By extension of the rest element 6 transversely along the Y direction over the screen 13, the screen 13 may be operated. For example, if the screen 13 has a touch-sensitive region T. The rest surface 7 can also be comfortably used by the passenger. Irrespective of the engaged gear selection mode or drive stage selector mode, this does not impair the operation of the touch-sensitive region T. If the hand rests on the rest surface 7 while the user is operating the touch-sensitive region T, there is not the risk here of the shift element 10 being accidentally moved or triggered.

The shift element 10 can be moved by movement of the thumb and the index finger. The shifting is intuitive by the configuration and the directions of movement of the shift element 10. By displacement 23 between the stowage position S1 and the shift position S2, it is directly apparent with reference to the spatial position of the shift element 10 whether the motor vehicle is in the gear selection mode P. No electrically operated display is therefore necessary for this purpose, the display also being possible when the motor vehicle 1 is switched off.

In the motor vehicle 1, a hand rest element is therefore positioned in front of a display or screen 13. The hand rest element is of such a width and positioned in such a manner that the complete display can be comfortably operated. The hand rest is immovable here.

Figure 7:
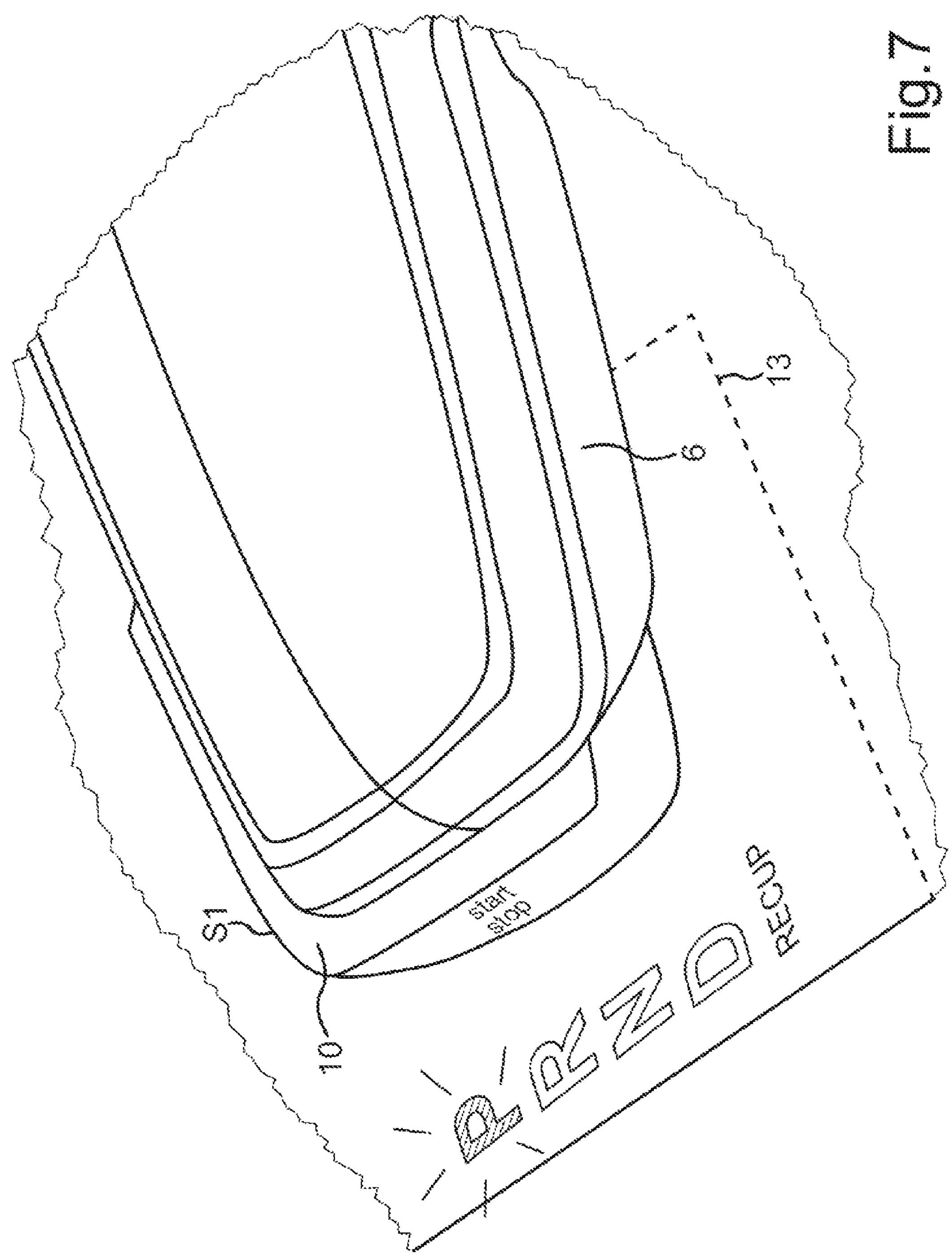
FIG. 7 is a schematic perspective view of the hand rest device with an alternative function setting in the stowage position.
Figure 8:
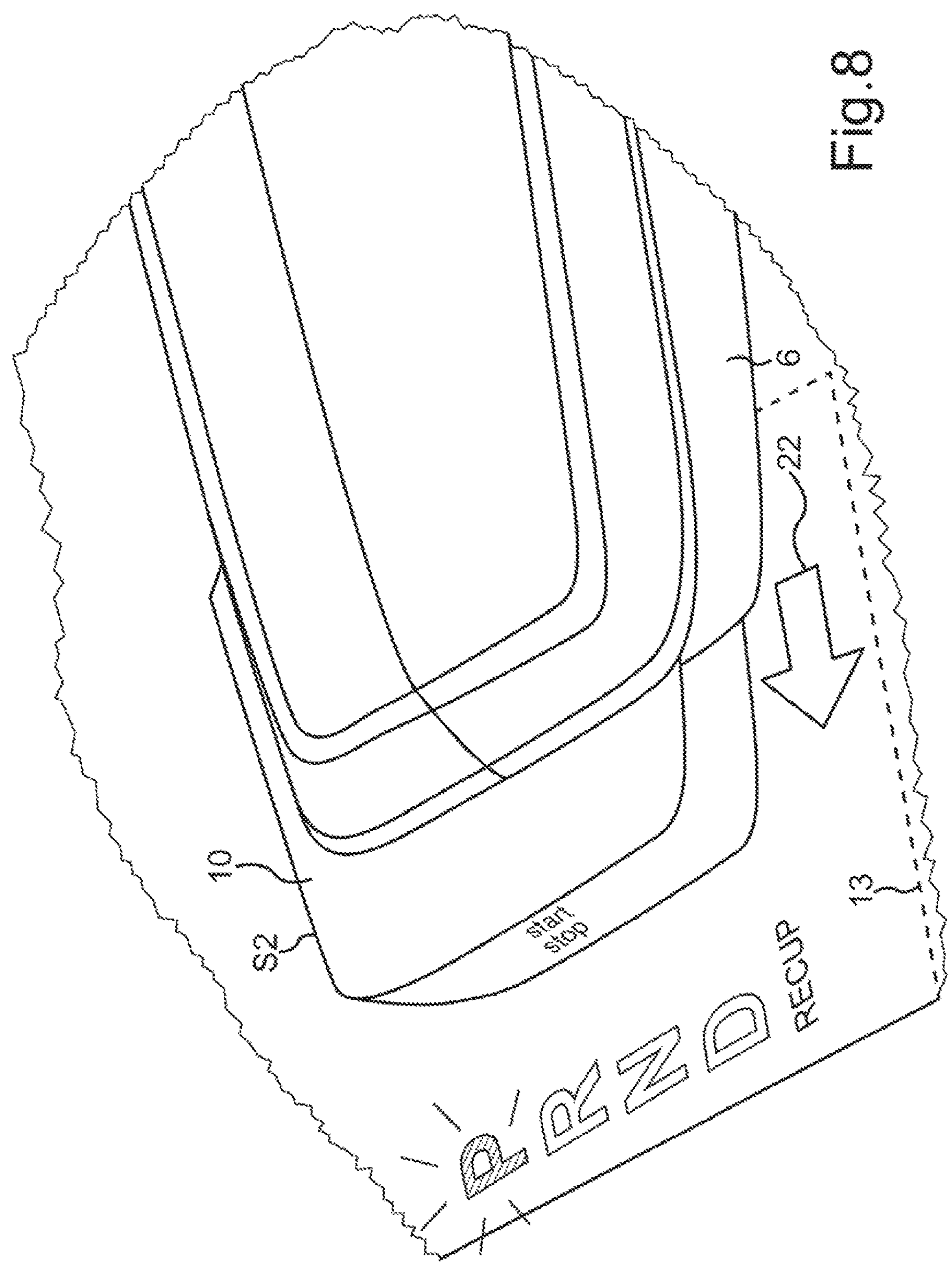
FIG. 8 is a schematic perspective view of the hand rest device from FIG. 7 after a change into the shift position.

FIG. 7 and FIG. 8 illustrate how the functioning of the start-stop shift element 12 for starting and stopping the engine/motor (internal combustion engine or electric motor) of the motor vehicle 1 can be integrated in the shift element 10. In the stowage position S1 according to FIG. 7, the engine/motor is held in a switched-off state. In the shift position S2 according to FIG. 8, the engine/motor is operated. It can be provided in this connection that, after the deployment movement 22, the gear selection mode P is set instead of the gear selection mode N described in the previous example.

Overall, the example shows how a shift-by-wire shift element can be provided in a manner integrated in a hand rest for a display.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A hand rest device for a motor vehicle having a shift-by-wire gear selection controller, comprising:

a rest element extending along a transverse direction from a passenger side of the hand rest device to a driver side of the hand rest device opposite to the passenger side, having a rest surface facing in a vertical direction and configured to receive a hand of a user; and a shift element, disposed at a driver-side end of the rest element, between the rest surface and a lower side of the rest element opposite to the rest surface, providing input to the shift-by-wire gear selection controller, the shift element being configured to move along the transverse direction between a stowage position with the shift element substantially recessed in the rest element, and a shift position, in which the shift element projects further out of the rest element than in the stowage position, the shift element being mounted immovably in a longitudinal direction when in the stowage position and movable one of unidirectionally and bidirectionally in the longitudinal direction when in the shift position.

2. The hand rest device as claimed in claim 1, wherein the shift element includes a push-push lock configured to release the shift element out of the stowage position into the shift position when the shift element is pressed into the rest element, and to hold the shift element in the stowage position after the shift element is pressed in again.

3. The hand rest device as claimed in claim 1, wherein the shift element includes a finger rest region projecting out of the rest element in the longitudinal direction, at least when the shift element is in the shift position.

4. The hand rest device as claimed in claim 1, wherein, when the shift element is in the shift position, the shift element is mounted monostably with respect to the longitudinal direction.

5. The hand rest device as claimed in claim 1, further comprising a shift control providing input to the shift-by-wire gear selection controller when the shift element is in the shift position by responding to a first deflection of the shift element along the longitudinal direction by generating a reverse shift signal indicating selection of a reverse gear and by responding to a second deflection of the shift element along the longitudinal direction, opposite to the first deflection, by generating a forward shift signal indicating selection of a forward automatic gear.

6. The hand rest device as claimed in claim 1, wherein the driver-side end of the rest element is held only by the rest element and is configured to be graspable by the user.

7. The hand rest device as claimed in claim 1, further comprising:

a bottom region facing the lower side of the rest element with the rest element extending over the bottom region; and a screen having a display area configured to display pixel-based display graphics in the bottom region of the hand rest device.

8. The hand rest device as claimed in claim 7, further comprising a screen control configured to control the screen to display on the display area a gear selection mode set at the shift-by-wire gear selection controller.

9. The hand rest device as claimed in claim 1, further comprising at least one of an additional mechanical button and an operating panel having a touch-sensitive surface, and wherein, in the shift position, the shift element is only released for movement along the longitudinal direction at least one of after and during actuation of the at least one of the additional mechanical button and the operating panel with the touch-sensitive surface.

10. The hand rest device as claimed in claim 1, wherein a start-stop function for starting and stopping an engine of the motor vehicle is integrated in the shift element by the hand rest device being configured to keep the engine in a switched-off state in the stowage position of the shift element and to operate the engine in the shift position of the shift element.

11. A motor vehicle, comprising:

a driver seat;

a passenger seat;

a central console between the driver seat and the passenger seat;

a shift-by-wire gear selection controller; and a hand rest device, disposed in the central console, including a rest element extending along a transverse direction from a passenger side of the hand rest device to a driver side of the hand rest device opposite to the passenger side, having a rest surface facing in a vertical direction and configured to receive a hand of a user; and a shift element, disposed at a driver-side end of the rest element, between the rest surface and a lower side of the rest element opposite to the rest surface, providing input to the shift-by-wire gear selection controller, the shift element being configured to move along the transverse direction between a stowage position and a shift position with the shift element substantially recessed in the rest element in the stowage position and the shift element projecting further out of the rest element in the shift position than in the stowage position, the shift element being mounted immovably in a longitudinal direction when in the stowage position and movable one of unidirectionally and bidirectionally in the longitudinal direction when in the shift position.

12. The motor vehicle as claimed in claim 11, wherein the rest element of the hand rest device is immovable relative to the central console.

13. The motor vehicle as claimed in claim 11, wherein the shift element includes a push-push lock configured to release the shift element out of the stowage position into the shift position when the shift element is pressed into the rest element, and to hold the shift element in the stowage position after the shift element is pressed in again.

14. The motor vehicle as claimed in claim 13, wherein, when the shift element is in the shift position, the shift element is mounted monostably with respect to the longitudinal direction.

15. The motor vehicle as claimed in claim 14, further comprising a shift control providing input to the shift-by-wire gear selection controller when the shift element is in the shift position by generating a reverse shift signal indicating selection of a reverse gear in response to a first deflection of the shift element along the longitudinal direction and by generating a forward shift signal indicating selection of a forward automatic gear in response to a second deflection of the shift element along the longitudinal direction, opposite to the first deflection.

16. The motor vehicle as claimed in claim 15, wherein the driver-side end of the rest element is held only by the rest element and is configured to be graspable by the user.

17. The motor vehicle as claimed in claim 16, wherein the hand rest device includes a bottom region facing the lower side of the rest element with the rest element extending over the bottom region, and a screen having a display area configured to display pixel-based display graphics in the bottom region of the hand rest device.

18. The motor vehicle as claimed in claim 17, further comprising a screen control configured to control the screen to display on the display area a gear selection mode set at the shift-by-wire gear selection controller.

19. The motor vehicle as claimed in claim 17, wherein the hand rest device includes at least one of an additional mechanical button and an operating panel having a touch-sensitive surface, and wherein, in the shift position, the shift element is only released for movement along the longitudinal direction at least one of after and during actuation of the at least one of the additional mechanical button and the operating panel with the touch-sensitive surface.

20. The motor vehicle as claimed in claim 19, wherein the hand rest device is configured to keep the engine in a switched-off state when the shift element is in the stowage position of the shift element and to operate the engine when the shift element is in the shift position.

* * * * *